UNITED STATES PATENT OFFICE.

SENSHIRO MORIMURA, OF TOKYO, JAPAN.

MANUFACTURE OF PLASTIC COMPOUNDS.

955,421. Specification of Letters Patent. Patented Apr. 19, 1910.

No Drawing. Application filed August 30, 1909. Serial No. 515,165.

*To all whom it may concern:*

Be it known that I, SENSHIRO MORIMURA, a subject of the Emperor of Japan, residing at Tokyo, Japan, have invented certain new and useful Improvements in Manufacture of Plastic Compounds; and I do hereby declare the following to be a full, clear, and exact description of the invention, such as will enable others skilled in the art to which it appertains to make and use the same.

My invention relates to improvements in the manufacture of certain plastic compounds, and it consists in providing a material which may be used as a substitute for wood in various uses such as, weather boards, roof tiles, molding, or ornamental figures, embellishing ridges, and for other like purposes in architecture. It may also be used in the manufacture of articles and utensils such as posts, barrels, tubs, buckets, pails, boxes, trunks, boats, and as a substitute for castings in the manufacture of hollow posts for electric railroads or other purposes, pipes for conduits, drainage or the like, various kinds of wheels and pulleys, and for a great variety of other purposes.

My invention consists in the process whereby the product referred to is made, and in the product resulting from said process.

In the manufacture of the plastic compound, hereinbefore referred to, a base is used consisting mainly of vegetable fiber, with a small amount of animal hair, or instead of the animal hair short lengths of hemp fiber may be used As suitable raw material I would mention rice straw, hay, cotton stalks, reeds, bean stalks, and other various kinds of plants having suitable fiber.

The invention may be probably more conveniently and economically applied using rice straw, since this is ordinarily a waste product, having little or no value, either as stock feed or in the arts, and which can be had in large quantities at a cheap price. Any suitable kind of hair may be used, but it is, of course, preferable to use the cheaper qualities of hair such as is not suitable for spinning. For instance, such hair of cattle, horses, pigs or other animals, as has little, if any value in the arts.

In carrying out the process, the various steps are as follows:

*I. Preparing the vegetable fiber.*—Take say, one thousand pounds of rice straw, cut up the straws in a suitable chopper into lengths of approximately one or two inches, then soak the product in fresh water and drain off the superfluous water in any convenient way. Then take the soaked product and immerse it in a pan containing a solution of calcium hydroxid with a little common salt added. The proportions being about fifteen pecks of quick lime to about 600 gallons of water and about 2 per cent. salt. The straw chips are boiled in this solution for about one hour and a half more or less, the length of time required for the boiling operation being dependent upon the nature of the straw being treated, and this time may be determined by taking out a few of the chips and examining the same. If the boiling has been sufficiently long, the chip will break with a smooth fracture. It is important not to boil too long or the strength of the fiber will be weakened too much. While boiling it is preferable to keep the straw chips well stirred up. After the boiling operation is completed, the chips should be thoroughly washed, using plenty of water, to remove the alkali, preferably soaking in running water. No attempt is made to grind up the pulp thus formed as in paper making, it being important to retain as far as possible the length of the fiber. After thoroughly draining off the water, which may best be done by either placing the chips on a wire sieve or having a wire sieve as a false bottom for the washing vat; immerse in a solution of tannic acid in which one pound of tannic acid is used to every ten gallons of water. The chips should be soaked in this solution for about six or seven hours. At the end of this time these chips should be taken out and placed on a wire sieve or screen to dry thoroughly, while exposed to the open air, and when the chips are thoroughly dry, then dip the same in a solution of bichromate of potash and water, the proportions being approximately one pound of bichromate of potash to every fifteen gallons of water. Finally, wash in clear water, and dry.

*II. Preparing the hair.*—In preparing the hair for treatment, first boil the hair in fresh water in a closed vessel at a high temperature, so as to extract the grease and other soluble matter. Then removing the grease and the dregs from the vessel, put the hair into another vat containing a solution of from 2 to 3 per cent. washing soda, about 3 per cent. of washing soap, and 94 to 95 per cent. of water, mixing same at a temperature of about 40° to 50° C. and stirring for about an hour. After taking out, wash the same in clean water with a little ammonia, and dry thoroughly, preferably in a drier.

*III. Mixing hair and vegetable fiber.*—Mix the dry hair and fiber intimately in a suitable mixer, using anywhere from 1 per cent. to 5 per cent. of hair to 95 per cent. to 99 per cent. of dry fiber, prepared as previously described. The proportion of hair is optional, more being needed for making articles which require greater tensile strength or resistance to fracture. In some instances hemp may be used in place of the hair, in which case it is cut into lengths of about one inch, and is mixed in with the prepared rice straw chips in the same manner as has already been described with reference to the hair. In such cases threads of cotton waste may be added.

*IV. Adding liquid glue.*—The mixture of fibrous material just referred to is then immersed in a solution of alum and liquid glue in the proportions of about 42 pounds of alum and 67 pounds of solid glue to every two hundred gallons of water, this solution having been prepared by boiling for about an hour, stirring thoroughly, and strained. Into the solution thus prepared, the fibrous matter is introduced, is stirred and boiled for about an hour.

*V. Adding resin soap.*—After boiling for the necessary time in this solution of glue and alum, put into the same vessel a sufficient quantity of resin soap, a gelatinous compound prepared from pine resin and soda, as will be hereinafter described. Stir in this resin soap and mix well, retaining the heat at between 70° and 80° C. When it has been properly incorporated, the operation of manufacturing the pulp is complete and the operation of molding is begun. In preparing the resin soap just described, about 170 pounds of washing soda is dissolved in about two hundred gallons of boiling water and about 172 pounds of powdered resin is added. Continue the boiling, stirring continuously. After about four hours boiling the solution will coagulate. When beginning to coagulate, bubbles will form, but gradually they will decrease and the product will become a gelatinous transparent mass. Leave this to cool for a while, until the bubbles disappear. To test the completeness of the operation, dissolve in warm water, when it will produce a light buff-colored liquid. If there remains no undissolved matter, the complete combination of the resin and soda is assured. The resin soap thus formed, is dissolved in warm water and the liquid strained through a strainer, and it is ready for use in the final step of preparing the pulp, already described.

*VI. Molding.*—Remove the plastic mass of pulp which is the result of the last step of the foregoing process to a warm room and put into a suitable straining mold made, for instance, of a wire frame covered with suitable textile fabric, until the moisture is drained out and the article attains its approximate form. When the moisture has been drained out sufficiently, remove the article from the straining mold and put it into a pressure mold, where it is heated, while hydraulic pressure is being applied, and is compressed to the shape and size needed. Allow it to remain in the pressure mold until the material has become set so that the article will retain its form and size, and then remove it to a drying room, and dry it at a temperature of approximately 70° to 80° C.

*VII. Finishing processes.*—The article which is molded as hereinbefore described, is now preferably subjected to one or more finishing processes, such as weather proofing, water proofing, fire proofing, varnishing, or the like. The article being molded and dried, as previously explained, may be weather proofed, as follows: Soak the article for an hour or longer in a solution of approximately 20 per cent. of formalin and 80 per cent. of pure water. Then remove the article and dry it well at a temperature of about 40° C. Then soak it in a solution of about 15 per cent. gelatin, 15 per cent. glycerin and 70 per cent. of water. Then remove the same and allow this coating to harden. Then soak in a solution of formalin again and remove and dry; then put it into a solution composed of 20 per cent. of glue, 4 per cent. of bichromate of potash and 76 per cent. of water, and quickly take it out and dry it in the sun or open air. The article may now be varnished, or treated with waterproof material, or fireproofed, if desired.

If it be desired to use the article for water pipes, barrels, or buckets, etc., intended to be immersed in or to hold water, one or more layers of varnish composed of 90 per cent. of linseed oil, 5 per cent. of pitch, 2 per cent. of rubber and three per cent. of litharge, may be used. These are made into a varnish by stirring well and boiling. For coarser work, a varnish composed of 7 per cent. of pitch and 93 per cent. of linseed oil may be used. In this case heat the pitch and pour in the linseed oil, mixing well to form a varnish. If it is desired to fireproof the material, instead of waterproofing as just described; after the bath of bichromate of potash and glue, and drying in the sun, soak the article in a bath composed of 6 per cent. borax, 10 per cent. boracic acid, 26 per cent. chlorid of ammonium and 58 per cent. of water, which has been heated to a temperature of about 40° C. Dry the article and varnish it with silicate of soda. Then immerse it again in the borax and boracic acid and chlorid of ammonium solution already referred to, and dry. Then varnish again with silicate of soda, then apply a coating of powdered asbestos, and lastly, revarnish with silicate of soda. To make a smooth surface after covering with asbestos powder, rub gently with a trowel and again cover with silicate of soda. These various immersions and applications just described will result in a fireproof coating incasing the material.

It will be obvious that the various steps of finishing, waterproofing or fireproofing may be varied in many respects. It will also be noted that, in the first step of treating the chopped up rice stalks, the quick lime may be replaced by caustic soda or carbonate of soda in suitable proportions. For instance, about 14 pounds of either caustic soda or carbonate of soda to 60 gallons of water, would form a satisfactory alkaline solution. Again, in the second step of preparing the chopped straw, instead of the tannic acid solution, a solution may be employed which is prepared as follows: One pound of catechu and three gallons of hot water are mixed well until the catechu is dissolved, then add one gallon of water and ten drams of copper sulfate; pass the material through a roller, crushing up the solid particles and then put them in a pan with 20 gallons of water and two pounds of bichromate of potash and boil again for fifteen minutes. Or, instead of the tannic acid in the second step above referred to an equivalent quantity of extract of oak bark may be used.

The product resulting from the above described process is hard, strong, tough and elastic; is much lighter than cast iron; is more durable than timber, is far lighter and less friable than cast iron or tiling; is cheap; and may be fireproofed or waterproofed and polished or finished, as desired.

I do not mean to confine myself to the precise proportions of the various ingredients used in the various steps of the process, or to the precise temperatures indicated, or to the precise time required for the various steps of the process, as these would ordinarily be varied according to the material being treated, and atmospheric and other conditions.

Having thus described my invention, what I claim and desire to secure by Letters-Patent of the United States is:

1. The process of preparing and treating a plastic compound, which consists in treating straw or similar fibrous vegetable matter by chopping up same into short lengths, boiling the chips thus secured in an alkaline solution, washing the product in fresh water, then soaking in a solution of tannic acid, drying the fibrous product, mixing with a small percentage of cleansed animal hair, boiling the mixture in a solution of glue and alum, adding resin soap to the glue solution, removing the pulp thus formed, and molding same to the desired shape, substantially as described.

2. The process of preparing and treating a plastic compound, which consists in treating straw or similar fibrous vegetable matter by chopping up same into short lengths, boiling the chips thus secured in an alkaline solution, washing the product in fresh water, then soaking in a solution of tannic acid, drying the fibrous product, mixing with a small percentage of cleansed animal hair, boiling the mixture in a solution of glue and alum, adding resin soap to the glue solution, removing the pulp thus formed, and molding same to the desired shape, then immersing the article thus formed in a formalin solution, then drying same, then soaking it in a solution of gelatin and glycerin, and removing same and allowing the surface of the article to harden, then soaking again in a formalin solution and allowing to dry, and then dipping it in a solution of glue and bichromate of potash, and allowing it to dry in the open air, substantially as described.

3. The process of preparing and treating a plastic compound, which consists in treating straw or similar fibrous vegetable matter by chopping up same into short lengths, boiling the chips thus secured in an alkaline solution, washing the product in fresh water, then soaking in a solution of tannic acid, drying the fibrous product, mixing with a small percentage of cleansed animal hair, boiling the mixture in a solution of glue and alum, adding resin soap to the glue solution, removing the pulp thus formed, and molding same to the desired shape, then immersing the article thus formed in a formalin solution, then drying same, then soaking it in a solution of gelatin and glycerin, and removing same and allowing the surface of the article to harden, then soaking again in a formalin solution and allowing to dry, and then dipping it in a solution of glue and bichromate of potash, and allowing it to dry in the open air, and finally coating the product thus secured with a waterproof or fireproof varnish, substantially as described.

4. The product of the hereindescribed process, which process consists in treating straw or similar fibrous vegetable matter by chopping up same into short lengths, boiling the chips thus secured in an alkaline solution, washing the product in fresh water, then soaking in a solution of tannic acid, drying the fibrous product, mixing with a small percentage of cleansed animal hair, boiling the mixture in a solution of glue and alum, adding resin soap to the glue solution, removing the pulp thus formed, and molding the same to the desired shape, then immersing the article thus formed in a formalin solution, then drying same, then soaking it in a solution of gelatin and glycerin, and removing same and allowing the surface of the article to harden, then soaking again in a formalin solution, and allowing to dry, and then dipping it in a solution of glue and bichromate of potash, and allowing it to dry in the open air, said product being a tough, strong, rigid, and durable material, substantially as described.

5. The process of preparing and treating a plastic compound, which consists in treating straw or similar fibrous vegetable matter by chopping up same into short lengths, boiling the chips thus secured in an alkaline solution, washing the product in fresh water, then soaking in a solution of tannic acid, drying the fibrous product, mixing with a small percentage of cleansed fiber, boiling the mixture in a solution of glue and alum, adding resin soap to the glue solution, removing the pulp thus formed, and molding same to the desired shape, substantially as described.

6. The process of preparing and treating a plastic compound, which consists in treating straw or similar fibrous vegetable matter by chopping up same into short lengths, boiling the chips thus secured in an alkaline solution, washing the product in fresh water, then soaking in a solution of tannic acid, drying the fibrous product, mixing with a small percentage of cleansed fiber, boiling the mixture in a solution of glue and alum, adding resin soap to the glue solution, removing the pulp thus formed, and molding same to the desired shape, then immersing the article thus formed in a formalin solution, then drying same, then soaking it in a solution of gelatin and glycerin, and removing same and allowing the surface of the article to harden, then soaking again in a formalin solution and allowing to dry, and then dipping it in a solution of glue and bichromate of potash, and allowing it to dry in the open air, substantially as described.

7. The process of preparing and treating a plastic compound, which consists in treating straw or similar fibrous vegetable matter by chopping up same into short lengths, boiling the chips thus secured in an alkaline solution, washing the product in fresh water, then soaking in a solution of tannic acid, drying the fibrous product, mixing with a small percentage of cleansed fiber, boiling the mixture in a solution of glue and alum, adding resin soap to the glue solution, removing the pulp thus formed, and molding same to the desired shape, then immersing the article thus formed in a formalin solution, then drying same, then soaking it in a solution of gelatin and glycerin, and removing same and allowing the surface of the article to harden, then soaking again in a formalin solution and allowing to dry, and then dipping it in a solution of glue and bichromate of potash, and allowing it to dry in the open air, and finally coating the product thus secured with a waterproof or fireproof varnish, substantially as described.

8. The product of the herein described process, which process consists in treating straw or similar fibrous vegetable matter by chopping up same into short lengths, boiling the chips thus secured in an alkaline solution, washing the product in fresh water, then soaking in a solution of tannic acid, drying the fibrous product, mixing with a small percentage of cleansed fiber, boiling the mixture in a solution of glue and alum, adding resin soap to the glue solution, removing the pulp thus formed, and molding the same to the desired shape, then immersing the article thus formed in a formalin solution, then drying same, then soaking it in a solution of gelatin and glycerin, and removing same and allowing the surface of the article to harden, then soaking again in a formalin solution, and allowing to dry, and then dipping it in a solution of glue and bichromate of potash, and allowing it to dry in the open air, said product being a tough, strong, rigid, and durable material, substantially as described.

In testimony whereof, I affix my signature, in presence of two witnesses.

SENSHIRO MORIMURA.

Witnesses:
SHOICHI KOTARI,
R. M. PARKER.